United States Patent
Larson

(10) Patent No.: US 6,704,569 B2
(45) Date of Patent: Mar. 9, 2004

(54) CENTRALIZED USER DATABASE AND ADMINISTRATIVE NODE CONNECTING PRIVATE AND PUBLIC WIRELESS COMMUNICATIONS SYSTEMS

(75) Inventor: Dave Larson, Solna (SE)

(73) Assignee: Ericsson Inc., Research Triangle Park, NC (US)

( * ) Notice: Subject to any disclaimer, the term of this patent is extended or adjusted under 35 U.S.C. 154(b) by 389 days.

(21) Appl. No.: 09/901,306

(22) Filed: Jul. 9, 2001

(65) Prior Publication Data

US 2003/0008649 A1 Jan. 9, 2003

(51) Int. Cl.[7] ................................................. H04Q 7/20
(52) U.S. Cl. ................................ 455/426.1; 455/432.1; 455/433
(58) Field of Search ............................... 455/424, 422.1, 455/446, 448, 426.1, 432.1, 433, 462

(56) References Cited

U.S. PATENT DOCUMENTS

| 5,670,950 A | | 9/1997 | Otsuka | |
|---|---|---|---|---|
| 6,539,237 B1 | * | 3/2003 | Sayers et al. | 455/555 |
| 6,594,258 B1 | * | 7/2003 | Larson et al. | 370/353 |

FOREIGN PATENT DOCUMENTS

| EP | 1065904 | 1/2001 |
|---|---|---|
| WO | WO 0045611 | 8/2000 |

OTHER PUBLICATIONS

Cyr B L et al: "Wireless In–Building Services and Architectures" Bell Labs Technical Journal, Wiley, CA, US, vol. 2 No. 1 1998, pp. 30–38, XP000750435 ISSN: 1089–7089.

* cited by examiner

Primary Examiner—Erika Gary
(74) Attorney, Agent, or Firm—Coats & Bennett, P.L.L.C.

(57) ABSTRACT

A cluster of private wireless communications systems connects to a public wireless communications system via single administrative node. The administrative node includes a shared user database containing information associated with every user of the private systems. The administrative node also includes a shared system and configuration database containing network administration information for each private system in the cluster. The administrative node further includes a switching unit connected between each private system and to the public system. Roaming among the private systems in the cluster is facilitated by storing all user data at a central shared user database, accessed by each private system as necessary. System administration, particularly for shared system parameters, is simplified by a single administrative interface common to all the private systems. The entire cluster of private systems appears as a single connection to the public system, and utilizes only a single point code or other network address.

5 Claims, 2 Drawing Sheets

CENTRALIZED USER DATABASE AND ADMINISTRATIVE NODE CONNECTING PRIVATE AND PUBLIC WIRELESS COMMUNICATIONS SYSTEMS

BACKGROUND OF THE INVENTION

The present invention relates generally to the field of wireless communication systems, and specifically to a system architecture for connecting a plurality of private wireless communication systems to a public wireless communication system.

The wireless communications industry has experienced phenomenal growth in recent years. As public wireless communications systems continue to expand their coverage areas and communications handling capacity, wireless communication in public spaces has become ubiquitous.

Along with the growth of public wireless communications systems, private wireless communications systems, generally limited in geographic coverage, have also proliferated. A private wireless communications system may, for example, be a Private Wireless Office System (PWOS), typically deployed within a specific building or group of buildings, providing wireless communications services to employees, contractors, and other specified individuals, each of whom is registered with the private wireless communications system. Private wireless communications systems are attractive adjuncts to—and in many cases may supersede—traditional desktop telephone systems. The wireless systems increase the efficiency of communications, as individuals may be accessed even when they are not within specific "assigned" locations, such as offices.

In many cases, a plurality of private wireless communications systems may experience significant interaction with each other, and additionally with one or more public wireless communications systems. For example, a university or corporate campus may comprise many individual buildings, each of which is serviced by a separate private wireless communications system. Common areas, such as grounds and parking areas between and surrounding the buildings and the sports arena, and additionally the surrounding metropolitan area, may be covered by a public wireless communications system.

Ideally, a given user would be able to move seamlessly around on the campus, passing in and out of the range of the various public and private wireless communications systems, and maintain constant coverage and access to all wireless communications services. Under the usage models and network topologies of private wireless communications systems as currently deployed, the user is typically registered with one private wireless communications system as his "home" system. Accessing services within other private wireless communications systems is known as "roaming" and requires that the user either be registered with the other private wireless communications systems, or that administrative communication be directed to the user's home system for authorization. Each of the private wireless communications systems are connected to the public wireless communications system through a gateway within the public system, requiring that each private system be assigned a separate network address. Additionally, each private wireless communications system is separately maintained, requiring extensive overhead in network administration, as many tasks are duplicative.

SUMMARY OF THE INVENTION

The present invention comprises a method of linking a plurality of private wireless communications systems to a public wireless communications system. The method comprises routing all communications through a common administrative node, and performing network administration on the private wireless communications systems through the common administrative node. A communications link is established between the administrative node and the public wireless communications system, where the link is assigned a single network address. A communications link is also established between the common administrative node and each of the private wireless communications systems. All communications are routed between the private wireless communications systems and the public wireless communications system through the common administrative node. The common administrative node includes a shared user database containing information associated with each user of each private wireless communications system. The common administrative node also includes an administrative interface and a shared system and configuration database for the performance of network administration functions on each of the private wireless communications systems.

DETAILED DESCRIPTION OF THE INVENTION

Figure 1:
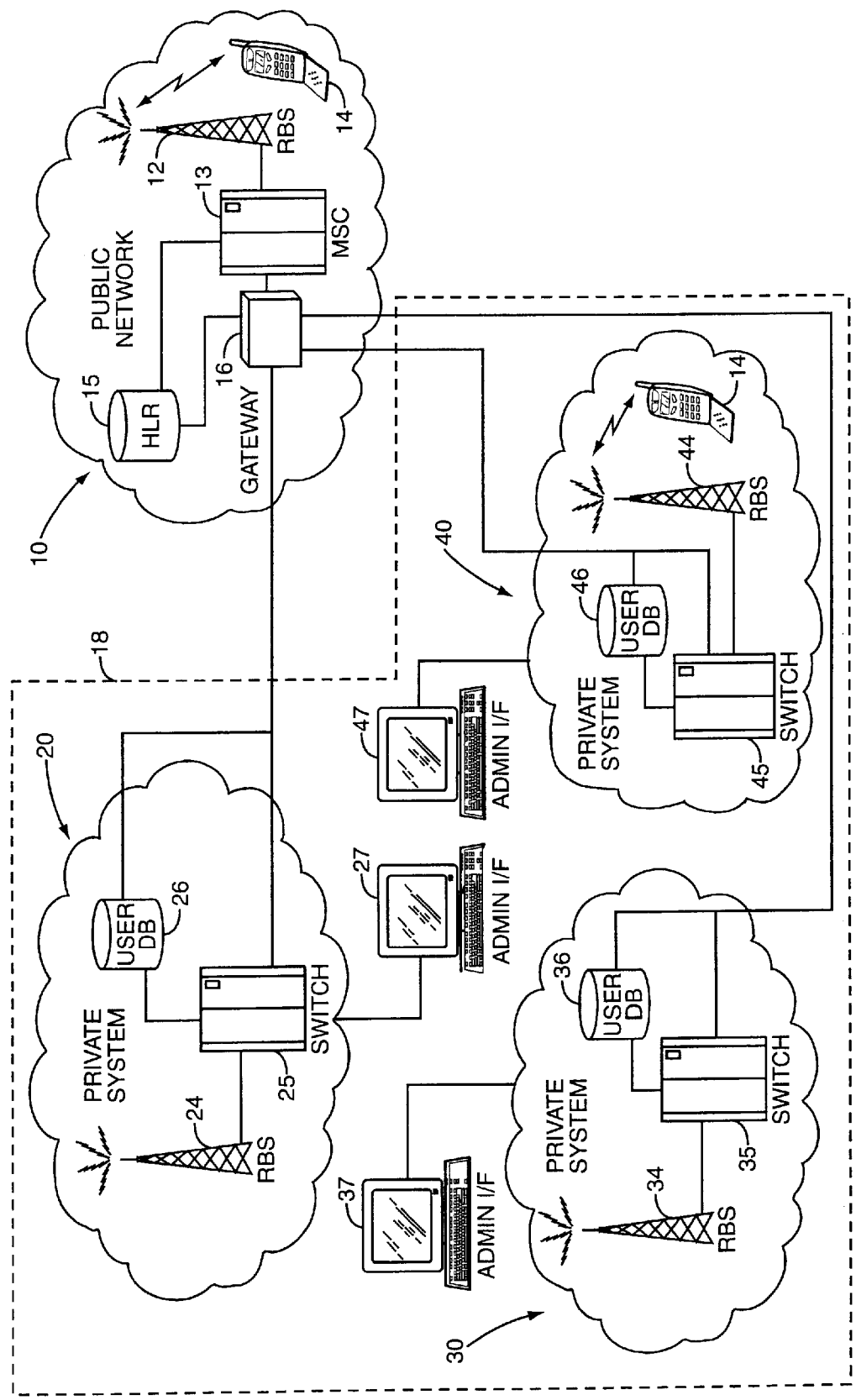
FIG. 1 is a network schematic representation of the prior art system architecture for interconnecting public and private wireless communications systems.

FIG. 1 illustrates a conventional system architecture for interconnecting a public wireless communications system 10 with a plurality of private wireless communications systems 20, 30, 40. The public wireless communications system 10 comprises a plurality of base stations 12 that are connected via a mobile services switching center (MSC) 13 to a plurality of private wireless communications systems 20, 30, 40 through gateway 16. The MSC 13 may additionally connect base stations 12 to a terrestrial communications network, such as the Public Switched Telephone Network (not shown). Each base station 12 is located in, and provides service to, a geographic region referred to as a cell. In general, there is one base station 12 for each cell within a given mobile communication network 10. Within each cell, there may be a plurality of mobile terminals 14 that communicate via radio link with the base station 12. The base station 12 allows the users of the mobile terminals 14 to communicate with other mobile terminals 14, or with users in one of the private wireless communications systems 20, 30, 40. The mobile services switching center (MSC) 13 routes calls to and from the mobile terminal 14 through the appropriate base station 12. Operatively connected to MSC 13 is a Home Location Register (HLR) 15. The HLR 15 stores information concerning subscribers to the public wireless communications system 10, including the user's names and addresses for billing purposes, the serial numbers of subscribed users' mobile terminals, and the services to which each user is entitled. The current location of each active user may additionally be stored in the HLR 15. Also connected to MSC 13 and HLR 15 is a gateway 16. The gateway 16 provides extensibility to the communications network of the public wireless communications system 10, by allowing communications handled by one or more private wireless communications systems 20, 30, 40 to be routed through the MSC 13.

A public wireless communications system 10 may employ a wide variety of communications standards and protocols, which are published by organizations such as the Telecommunications Industry Association/Electronics Industry Association (TIA/EIA) and the European Telecommunication Standards Institute (ETSI), including without limitation Time Division Multiple Access (TDMA) standards such as TIA/EIA-136 and the Global System for Mobile Communications (GSM), Code Division Multiple Access (CDMA) standards such as TIA/EIA-95, Wideband Code Division Multiple Access (WCDMA) standards such as cdma2000, Universal Wireless Communications (UWC) 136, and satellite communication standards such as Globestar. The details of the communication protocols used by the public wireless communications system 10 are not material to the invention.

As depicted in FIG. 1, the public wireless communications system 10 connects via gateway 16 to private wireless communications systems 20, 30, 40. A private wireless communications system 20, 30, 40 may be deployed within any geographic locus, such as an office building, an apartment complex, a hotel, or the like. In addition to their limited geographic scope, private wireless communications systems 20, 30, 40 are characterized by their access and usage rules. In a private wireless communications system 20, 30, 40, a user must be registered and authorized before wireless communications services are made available. The users in a private wireless communications system are authorized and granted access at the sole discretion of the system owner/operator, and are generally limited to employees of a company, students and faculty at a university, or a similar relationship. Additionally, users in a private wireless communications system 20, 30, 40 typically do not incur airtime charges for use of the system (hence, use of a private wireless communications system 20, 30, 40 is preferred over the public wireless communications system 10 where both are available). Conversely, any user who pays a fee and complies with certain objective rules must be granted access to the public wireless communications system 10, and users pay for their use of the system via airtime charges.

The private wireless communications systems 20, 30, 40 will be described herein with reference to private wireless communications systems 20. Private wireless communications systems 30 and 40 are directly analogous. In general, a number of similarly configured private wireless communications systems may be connected to the public wireless communications system 10.

To implement the private wireless communications system 20, mini base stations, also called radio heads 24, may be strategically placed throughout the service area so as to provide continuous radio communications services to mobile terminals 14 located therein. Radio heads 24 are similar in function to base stations 12 in the public wireless communications system, however, radio heads 24 typically utilize much lower-powered antennas so as to limit radio communications services coverage to a smaller geographic area. Functionally, radio heads 24 operate similarly to base stations 12. Private wireless communications systems covering a larger geographic area may deploy base stations 12, as in the public wireless communications system.

Private wireless communications system 20 comprises radio head(s) 24, switch 25, and user database 26. Also associated with private wireless communications system 20 is an administrative interface 27. Each radio head 24 provides RF communications to mobile terminals 14 within the service area of the private wireless communications system 20, as described above. Radio head(s) 24 connects to switch 25, which provides control and routing functionality analogous to that of the MSC 13. Also connected to switch 25 is a user database 26, containing information associated with each registered user who is authorized to access the private wireless communications system 20. An administrative interface 27 provides a user interface for the performance of network administrative functions, such as for example, updating information in user database 26, reconfiguring switch 25, and the like.

FIG. 1 depicts the typical interconnection of system components comprising the public wireless communications system 10 and the private wireless communications system 20, 30, 40. The private wireless communications systems 20, 30, 40 are functionally grouped into a cluster 18. This corresponds to, for example, several buildings in a campus, all owned and/or operated by the same entity. Under the network topology depicted in FIG. 1, each private wireless communications system 20, 30, 40 in cluster 18 connects directly to the public wireless communications system 10 via gateway 16. This configuration has several inherent shortcomings and inefficiencies.

First, in order to roam between separate private wireless communications systems 20, 30, 40 in cluster 18, a user must be recognized by each private system 20, 30, 40 as an authorized user. This effectively means that the user must be registered separately in each user database 26, 36, 46. Furthermore, for a user to receive exactly the same level of services and functionality within each private wireless communications system 20, 30, 40, i.e., for the user to move between the private systems in cluster 18 seamlessly, the user profile stored within each system in the user database 26, 36, 46 must have exactly the same content. This replication of user data throughout a plurality of private wireless communications systems 20, 30, 40 is inefficient and difficult to maintain.

Second, private wireless communications systems 20, 30, 40 currently require both system and user administration on a regular basis. While some of the changes and updates comprising this administration are local to each private wireless communications system 20, 30, 40, in a cluster 18 of cooperating private wireless communications systems, many of the required updates would be identical across all private systems 20, 30, 40. Thus, much of the administrative overhead must be replicated at each administration interface 27, 37, 47.

Finally, in order to support roaming between the private wireless communications systems 20, 30, 40 in cluster 18, each private system must communicate directly with the public wireless communications system 10. Thus, the public wireless communications system 10 must provide separate connectivity to each private system 20, 30, 40, and additionally must allocate a network point code or other network address to each private system 20, 30, 40. This increases the complexity of network configuration for the public wireless communications system 10, and reduces its available address space. For clustered private wireless communications systems 20, 30, 40, it would be advantageous from the point of view of the public wireless communications system 10 to have a single point of connectivity which could address users in all of the clustered private wireless communications systems 20, 30, 40.

Figure 2:
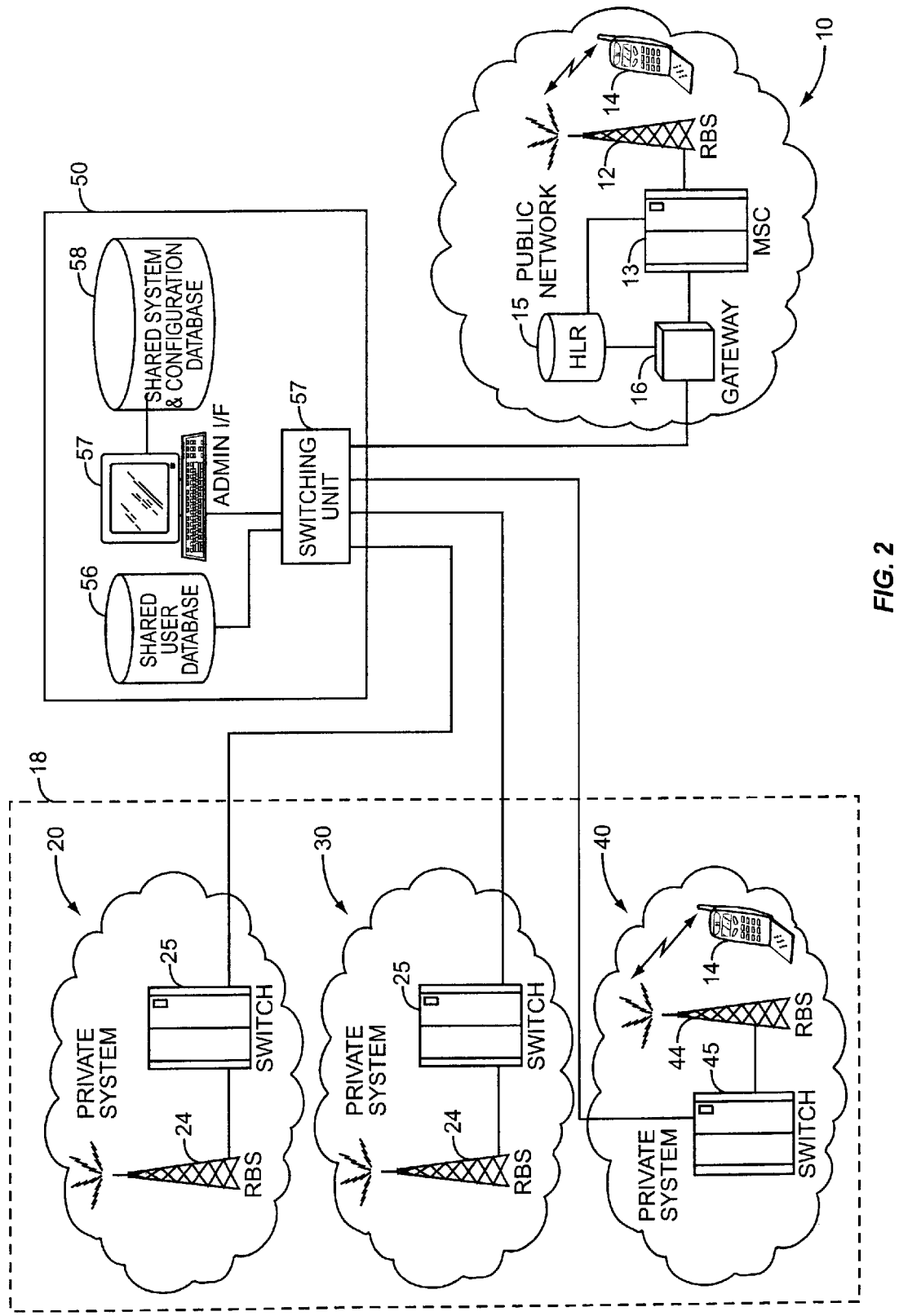
FIG. 2 is a network schematic representation of a system architecture for interconnecting public and private wireless communications systems according to the present invention.

FIG. 2 depicts the interconnection topology between the private wireless communications systems 20, 30, 40 in cluster 18, and the public wireless communications system 10, according to the present invention. All of the private systems, 20, 30, 40 connect to the public system 10 through a common network administrative node 50.

The administrative node 50 includes a switching unit 55, a shared user database 56, an administrative interface 57, and a shared system and configuration database 58. The switching unit 55 connects to the switch 25, 35, 45 of private wireless communications systems 20, 30, 40, respectively, and to the gateway 16 of public wireless communications system 10, originating, terminating and transiting voice and data communications among and between the respective wireless systems. The switching unit 55 may be implemented as a router, a crossbar switch, a series of SS7 protocol connections, or in a variety of other ways. The shared user database 56 contains information associated with all users of private wireless communications systems 20, 30, 40, including definitions of users and attributes for those users, such as services allowed, user identity, and the like, as well as controls information, such as where the user is allowed to roam. Through the administrative interface 57 and associated shared system and configuration database 58, all network administrative tasks for private wireless communications systems 20, 30, 40 may be performed. Such administrative tasks may include Operations and Maintenance (O&M) functions, including the ability for the user of administrative node 50 to set up and maintain information needed to define attached systems/networks, routing information, and the like.

The administrative node 50 may additionally include functionality not specifically depicted in FIG. 2. By way of explication and without limitation, the administrative node 50 may additionally include signaling interfaces to all networks with which the administrative node 50 may communicate. Such interfaces may contain or implement physical links, such as ethernet, as well as software to support higher-level protocols, such as Internet Protocol (IP). The administrative node 50 may additionally include performance management functions to provide access to cumulative and specific performance data for the private wireless communications systems 20, 30, 40. This allows performance management to be performed on all connected private systems as a network, rather than treating each as an autonomous entity. As another example, the administrative node 50 may also include a Man/Machine Interface (MMI) that provides connectivity to common components such as CRT's, printers, and the like, through which data can be transmitted between humans and the administrative node and all it's functions. Various other interfaces and functional modules may be included in the administrative node 50 of the present invention, and the examples disclosed herein do not limit the scope thereof.

The provision of a single administrative node 50 provides several advantages. All users of any of the clustered private wireless communications systems 20, 30, 40 are registered in the shared user database 56 at the administrative node 50. Any modifications to a user's profile, such as for example, changes in level of authorized service, need be entered only once, at the administrative node 50. As the user moves among the private wireless communications systems 20, 30, 40, the user's information is retrieved from the administrative node 50 as needed.

All of the private wireless communications systems 20, 30, 40 in a cluster 18 may be accessed for network administration functions through the administrative node 50, via its administrative interface 57 and associated shared system and configuration database 58. Functions shared among the private systems 20, 30, 40 may thus be efficiently administered in a single procedure; administration functions unique to each private wireless communications system 20, 30, 40 are also available at the central administrative node interface 57.

All communications between the public wireless communications system 10 and any of the private wireless communications systems 20, 30, 40 are routed through the switching unit 55 in the administrative node 50. In effect, this presents a single network communications connection to the public wireless communications system 10. The public wireless communications system 10 may thus assign a single point code or other form of network address to the entire cluster 18 of private wireless communications systems 20, 30, 40, allowing for ease of network configuration and conservation of address spaces.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the spirit and scope of the invention. The present embodiments are therefore to be construed in all aspects as illustrative and not restrictive and all changes coming within the meaning and equivalency range of the appended claims are intended to be embraced therein.

What is claimed is:

1. A method of connecting multiple private wireless communication systems to a public wireless communication system, comprising:

connecting a single administrative node to said public wireless communication system;

connecting each said private wireless communication system to said administrative node;

programming said administrative node with information about each user of each said private wireless communication system; and routing all communications between said private wireless communication systems and said public wireless communication system through said administrative node, wherein said administrative node is assigned a single network address by said public wireless communication system and said network address is shared by each user in each said private wireless communication system.

2. A method of enabling a mobile communications system user to access a plurality of private wireless communications systems, comprising:

entering said user in a centralized database shared by said plurality of private wireless communications systems, said database located at a common network administrative node for said plurality of private wireless communications systems;

connecting said plurality of private wireless communications systems to said common network administrative node;

connecting said administrative node to a public wireless communications system, said connection being assigned a single network address by the public system by which all said private wireless communications systems attached to said administrative node are addressed; and allowing each said private wireless communications system to access information associated with said user, such that said user may roam between said private wireless communications systems without the necessity of separate entry of user data at each said wireless communications system.

3. A method of administering a plurality of private wireless communications systems, comprising:

connecting each of said plurality of private wireless communications systems to a common communications network administrative node;

connecting said administrative node to a public wireless communications system using a single network address by which all said private wireless communications systems attached to said administrative node are addressed;

programming said administrative node with system data associated with each said private wireless communications system, such that a central shared repository of system and configuration data exists for all said plurality of private wireless communications systems;

programming said administrative node with user data associated with all users of said private wireless communications systems, such that a central shared repository of user data exists for users of all said plurality of private wireless communications systems; and performing network administrative tasks required for each said private wireless communications system via said administrative node.

4. A wireless communications system interface linking a plurality of private wireless communications systems to a public wireless communications system, comprising:

a common administrative node containing a shared system and configuration database and providing a single interface for the performance of network administration functions on each said private wireless communications system;

a shared user database associated with said common administrative node containing information associated with each user of each said private wireless communications system;

a communications link between said common administrative node and said public wireless communications system, said link assigned a single network address by which all said private wireless communications systems attached to said administrative node are addressed; and a plurality of communications links, one said link between said common administrative node and each said private wireless communications system;

said common administrative node and said databases operative to route communications between said private wireless communications systems and between each said private wireless communications system and said public wireless communications system.

5. A cluster of private wireless communications systems connected to a public wireless communications system via a common administrative node, comprising:

a plurality of private wireless communications systems;

a common administrative node connected to each of said private wireless communications systems, said common administrative node containing a shared system and configuration database and providing a single interface for the performance of network administration functions on each said private wireless communications system;

a shared user database associated with said common administrative node containing information associated with each user of each said private wireless communications system;

a communications link between said common administrative node and said public wireless communications system, said link assigned a single network address by said public wireless communications system by which all said private wireless communications systems attached to said administrative node are addressed; and a plurality of communications links, one said link between said common administrative node and each said private wireless communications system;

said common administrative node and said databases operative to route communications between said private wireless communications systems and between each said private wireless communications system and said public wireless communications system.

* * * * *